(No Model.) 6 Sheets—Sheet 1.
W. P. HOSKINS.
SHIP'S BERTH.
No. 601,143. Patented Mar. 22, 1898.
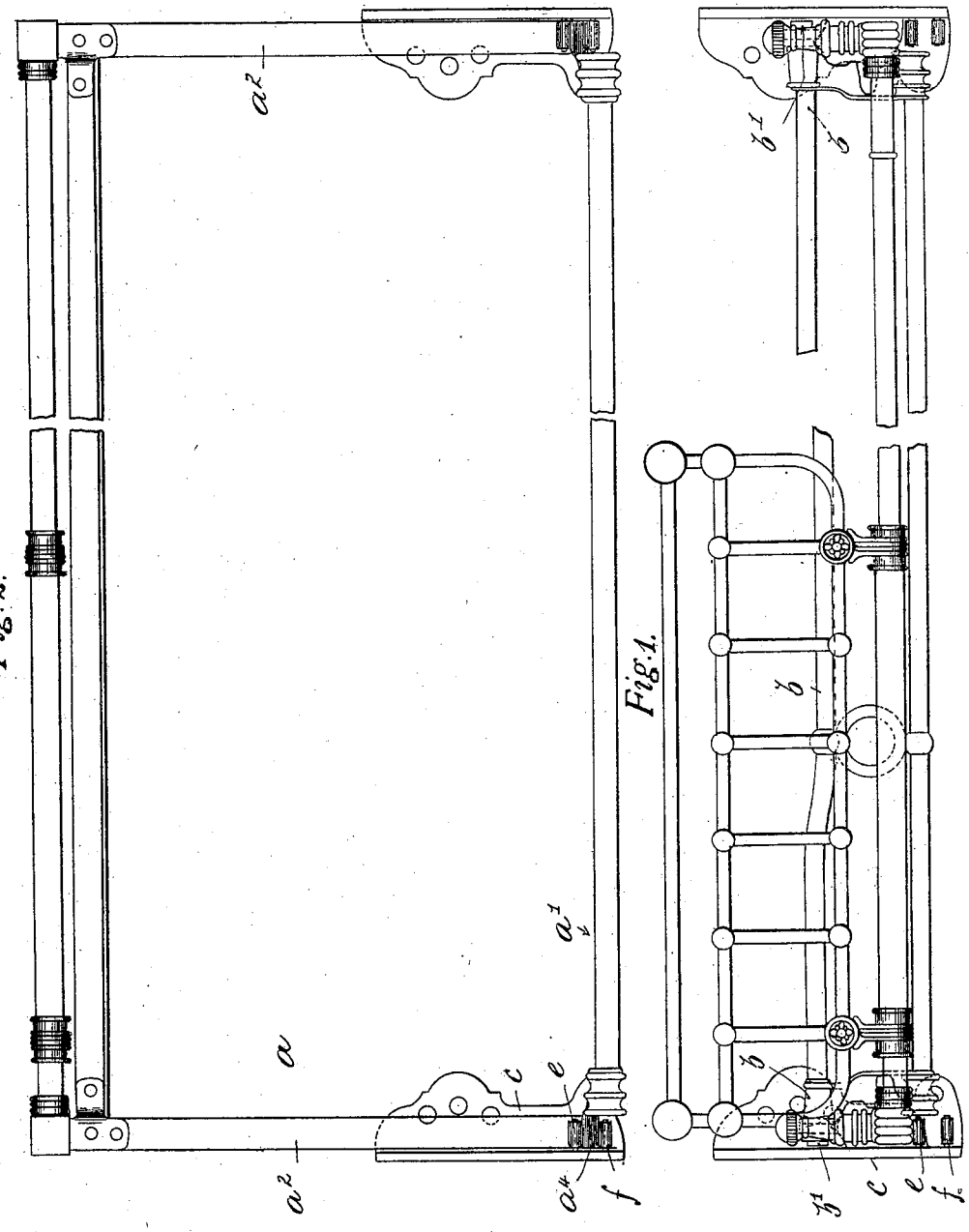
WITNESSES
INVENTOR
William P. Hoskins
BY James L. Norris
ATTY

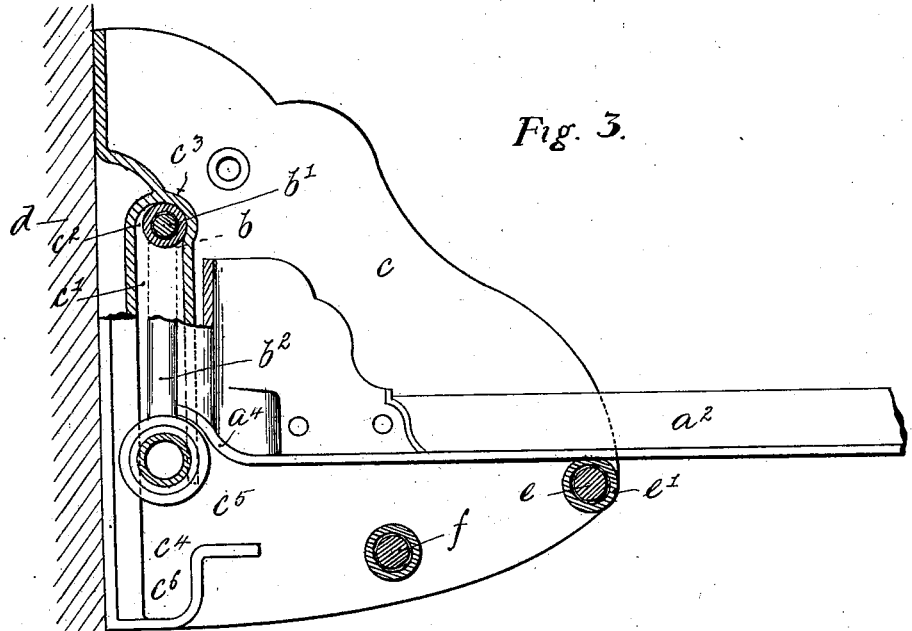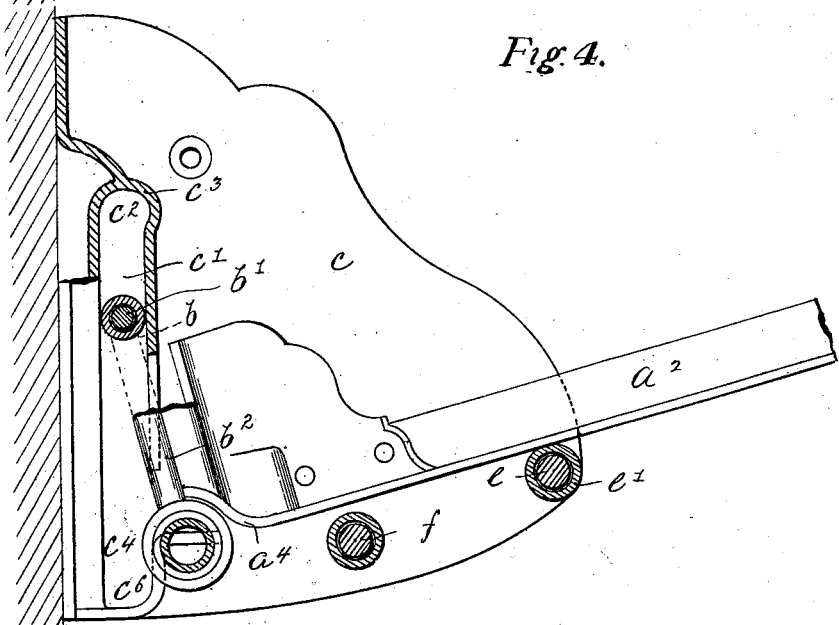

(No Model.) 6 Sheets—Sheet 3.

W. P. HOSKINS.
SHIP'S BERTH.

No. 601,143. Patented Mar. 22, 1898.

WITNESSES INVENTOR William P. Hoskins
BY James L. Norris.
ATTY (No Model.) 6 Sheets—Sheet 4.

W. P. HOSKINS.
SHIP'S BERTH.

No. 601,143. Patented Mar. 22, 1898.

WITNESSES

INVENTOR William P. Hoskins
BY James L. Norris.
ATTY (No Model.) 6 Sheets—Sheet 5.

W. P. HOSKINS.
SHIP'S BERTH.

No. 601,143. Patented Mar. 22, 1898.

WITNESSES

INVENTOR (No Model.)  6 Sheets—Sheet 6.

W. P. HOSKINS.
SHIP'S BERTH.

No. 601,143. Patented Mar. 22, 1898.

WITNESSES

INVENTOR
William P. Hoskins
BY James L. Norris
ATTY

UNITED STATES PATENT OFFICE.

WILLIAM PARISH HOSKINS, OF BIRMINGHAM, ENGLAND, ASSIGNOR TO HOSKINS & SON, LIMITED, OF SAME PLACE.

SHIP'S BERTH.

SPECIFICATION forming part of Letters Patent No. 601,143, dated March 22, 1898.

Application filed October 21, 1897. Serial No. 655,949. (No model.) Patented in England December 18, 1896, No. 29,031.

*To all whom it may concern:*

Be it known that I, WILLIAM PARISH HOSKINS, ship's-berth manufacturer, a subject of the Queen of Great Britain, residing at Neptune Works, Upper Trinity street, in the city of Birmingham, England, have invented certain new and useful Improvements in Ships' Berths, of which the following is a specification, and for which invention I have obtained Letters Patent of Great Britain, dated December 18, 1896, and numbered 29,031.

This invention relates to folding berths, furniture, and analogous fittings for ships, railway-carriages, barracks, dormitories, and the like, and has for one of its objects to admit of the inner edge of the berth-frame being brought absolutely close up to the bulkhead or wall against or approximate to which the berth or fitting is erected, and for another object to dispense with the use of the jointed auxiliary fittings now commonly employed in connection with such berths or furniture.

The invention more particularly pertains to that class or type of berth, furniture, or fitting in which the trunnion ends of an elevated rail or part at the inner edge of the berth or the like rise and fall within or against races or equivalents carried by fixed supporting-brackets mounted on the bulkhead or elsewhere and with the said trunnion ends, when the berth is turned down for use, taking their abutments against stops at the upper terminations of the races, while the berth-frame rests upon brackets disposed inward of its longer axis.

Figure 5:
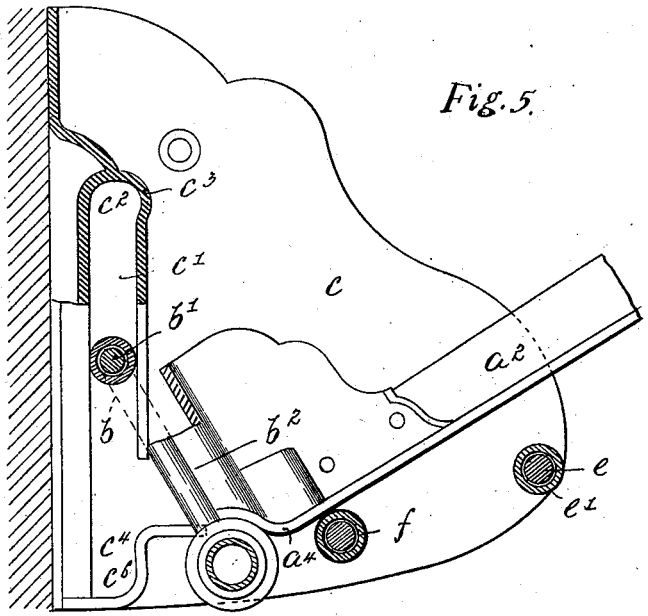
Figure 6:
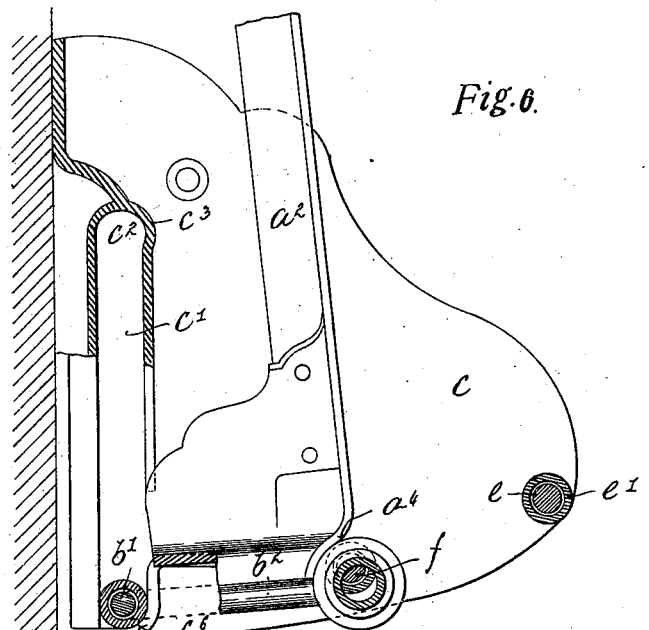
Figure 7:
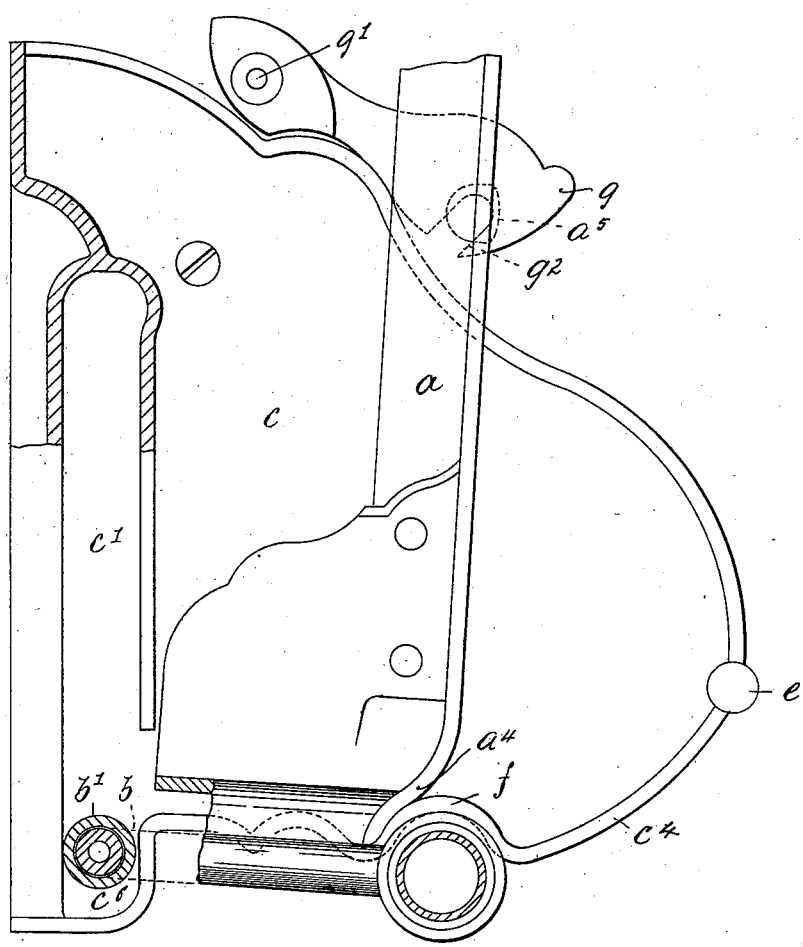
Figure 8:
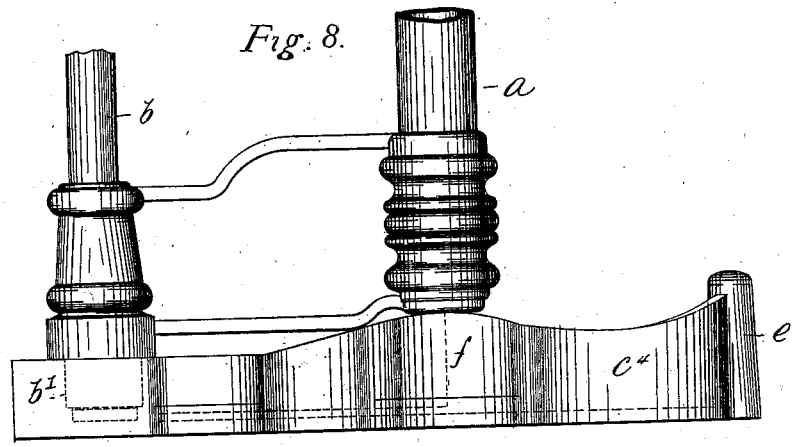
Figure 11:
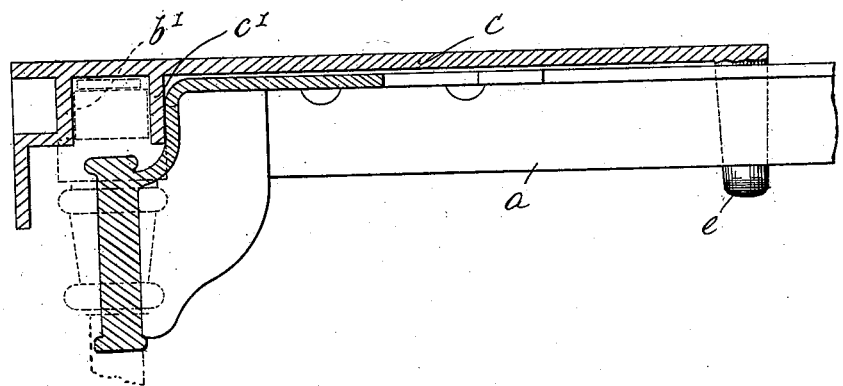
Figure 9:
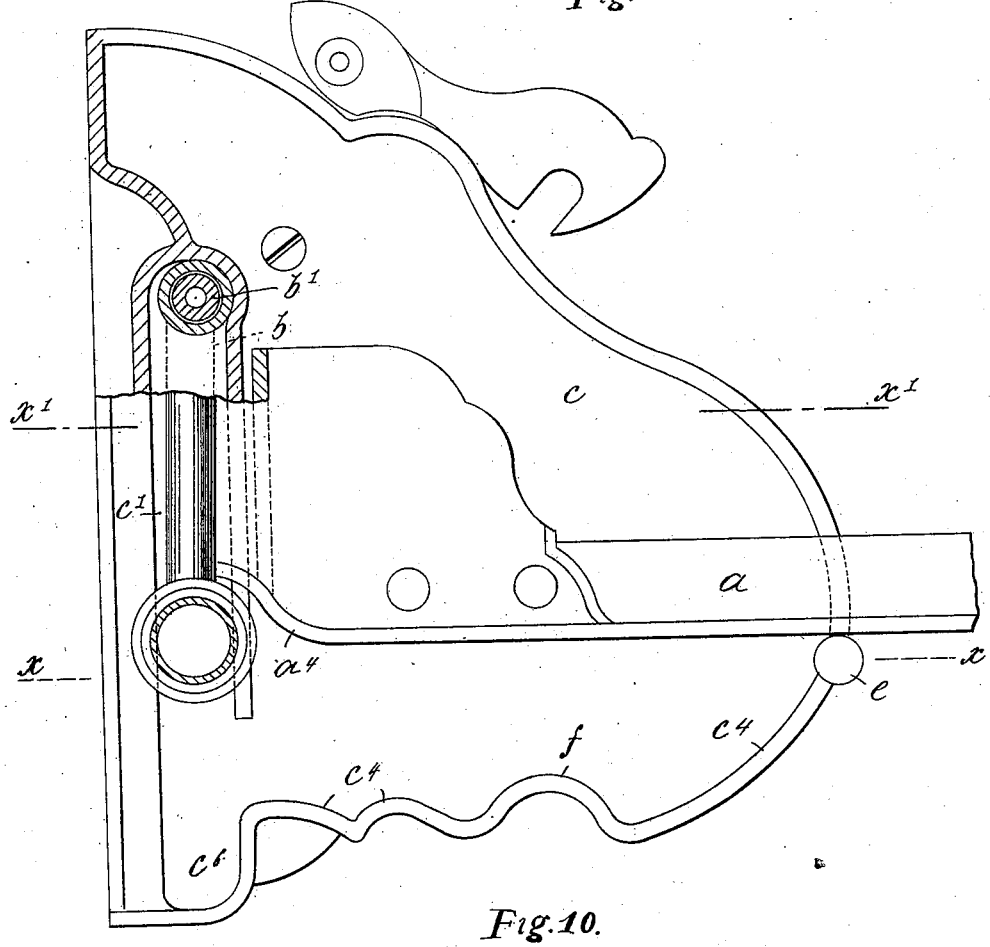
Figure 10:
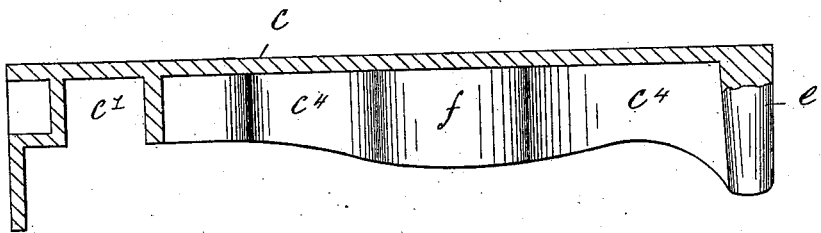

Figure 1 of the accompanying drawings represents, in front elevation, a folding ship's sleeping-berth embodying improvements constructed and arranged according to one form of my improvements, said view showing the berth turned down or in its position of use. Fig. 2 represents the said berth, Fig. 1, turned or folded up. Fig. 3 represents, upon an enlarged scale, a transverse vertical section of the berth, Fig. 1, taken across the same adjacent to one of the end rails and showing the construction of the supporting-bracket and its race, one such bracket, with its fittings, being arranged at each end of the berth. Fig. 4 represents a like section as Fig. 3, but showing the said berth and its supporting-fittings in the positions they assume when the turning-up movement is commenced. Fig. 5 is a like view as Fig. 4, but with the berth still further turned up. Fig. 6 represents another section, but with the berth fully folded. Fig. 7 represents a different form of my invention, in which view the berth is illustrated as folded up. Fig. 8 is a bottom plan view of the berth shown in Fig. 7. Fig. 9 is view similar to Fig. 7, illustrating the berth lowered. Fig. 10 is a horizontal section of the bracket upon the dotted line $x$ of Fig. 9, and Fig. 11 is a horizontal section taken upon the dotted line $x'$ of Fig. 9.

The same letters of reference indicate corresponding parts in Figs. 1 to 6 of the drawings.

The form of berth represented in the said Figs. 1 to 6 consists of an ordinary rectangular-shaped framing $a$, made, preferably, from angle metal, with the outsides of the angles presented so as to form the bed-bottom. The inward edge $a'$ of this frame carries an elevated rail $b$, having trunnions or studs $b'$, extending outwardly from the ends and preferably being fitted with rollers which work within, upon, or against upright or nearly upright races or channels $c'$, attached to or formed within or upon brackets $c$, supported either by a bulkhead $d$ or otherwise. The upper extremities $c^2$ of the races $c'$ at either end of the berth-framing are (or may be) closed by bearer-stops $c^3$ for the trunnions, while the bottom ends $c^4$ are either left open or they may be closed, or the races may have gates $c^5$, leading into them, as represented in the drawings, in order to admit of the trunnions or studs of the elevated end rail being introduced thereinto. When open races are employed, then the inner side of the frame may be prevented from coming away from the bulkhead by links, stops, or equivalents.

The inner elevated rail provides a means for preventing the bedding slipping down when the berth is turned up, while its supports $b^2$ form cranks for compelling the trunnions on the inner side of the berth-frame to rise and fall within the races on the turning up or down of the berth-bottom. The bottom edges of the opposite ends $a^2$ of the frame, inward of their middles, are supported when in position for use by outstanding studs or rests $e$ or the like carried by the main brackets (or by supplementary brackets) and fitted, if necessary, with rollers $e'$ for reducing the frictional contact between them and framing on the latter being turned and slid upon the studs or the like as fulcra when the berth is being folded up or turned down, while situated between the race and the said supporting-stud $e$ or the like of each main bracket and disposed at a lower plane than and clear of the said stud $e$ is a supplementary or independent fulcrum-stud $f$, which may be either rollered, as shown, or plain and which may form both a fulcrum for the inner part of the end of the frame to turn about and also a rest for the frame when in its folded position. The inner bottom corners $a^4$ of the framing ends may be rounded off in order that the same may slide more freely over the supplementary pins, studs, rests, or equivalents, which may be carried either by the main or separate brackets.

$c^6$ is a pocket or recess wherein the trunnion end of the inner elevated rail rests when the berth is folded up.

Assuming that the berth is turned down into its position of use, then the lower edges of the ends $a^2$ of the berth-frame are supported against downward movement by the first-named or outermost studs $e$ and against upward movement by the trunnion ends $b'$ (or a part of the elevated rail or its fittings) coming against the closed upper ends or bearer-stops $c^3$ of the races, while the supplementary fulcrum studs or supports $f$ are clear of the said framing ends by virtue of their lying in a plane below the berth-frame.

In folding up the berth from the positions represented in Figs. 1 and 2 lift the outer side, when the trunnion ends $b'$ of the elevated inner rail $b$ fall within the races $c$, and the inner side of the berth-frame also has a rear falling action, and in its downward movement the under sides of the frame ends $a^2$ slide along and turn upon the outermost supports $e$, as represented in Fig. 4, until the said under sides meet or come against the supplementary supports $f$, as represented in Fig. 5, when the framing then turns upon them as centers until the berth has been fully folded up, as shown in Figs. 2 and 6, when the trunnion ends come at the lower parts of the races. The whole weight of the berth now rests vertically upon the supplementary studs $f$, when by passing the outer side of the berth over or beyond the center the same is kept in its folded position, although, if necessary, supplementary hooks or catches pivoted on the bulkhead and engaging with studs or the like on the berth-frame may be employed as an auxiliary means of retaining the berth in its folded position. In again turning down the berth it is first turned on the supplementary studs, when the trunnion or ends of the elevated rail raise up the races, and then as the outer side falls the framing comes upon the outermost supports and leaves the supplementary ones, when the trunnions or ends of the rail now come against the bearer ends of the races.

Referring now to Figs. 7 to 11, inclusive, of the drawings, which represent a different arrangement embodying my invention, it will be seen that instead of employing a plain or rollered stud as the fulcrum-support, whereon the inner end of the berth-bottom rests when turned up, the lower edge of the supporting-bracket has a flange, a portion of which is curved upwardly and arranged to form the equivalent of or to fulfil the same function as the aforesaid fulcrum-stud. In these figures of the drawings, $a$ is the berth-framing; $b$, the elevated end rail; $c$, one of the brackets with race $c'$, wherein the rollered trunnion end $b'$ of the said elevated rail works, and $c^4$ is a flange formed at or attached to the lower edge of the same, the outer end of which terminates in the support or rest-stud $e$, while a portion of the said flange, coming inward of and at a lower horizontal plane than the said stud $e$, is curved or swelled upward at $f$ to constitute a support whereon the curved inner bottom corner $a^4$ of the berth-frame rests or is vertically supported when folded up, as represented in Figs. 7 and 8. $g$ is a hook pivoted at $g'$ to the bulkhead or the like and having a slotted part $g^2$, engaging over a stud $a^5$ on the end of the berth-framing to retain the same in its folded position. $c^6$ is the pocket or recess wherein the trunnion end $b'$ of inner elevated rail rests when the berth is folded up.

Having fully described my invention, what I desire to claim and secure by Letters Patent is—

1. In an improved article of folding furniture the combination with a bracket or support provided with a raceway, of a frame provided with a part movable in said raceway, a rest for the frame when in position of use, and a fulcrum-support intermediate the raceway and the rest and arranged in a plane lower than said rest and forming a fulcrum for the frame to turn upon during a part of its folding-up and turning-down movement, substantially as described.

2. The herein-described improved article of furniture consisting of a bracket or support provided with a raceway, a frame one side of which is provided with trunnions movable in said raceway, a rest to support the frame when in position for use and a fulcrum-support arranged intermediate said rest and raceway and in a lower plane than said rest to serve as a fulcrum for the same to turn upon during a part of its folding-up and turning-down movements and also as a support for said frame when in its folded-up position, substantially as described.

In testimony whereof I have hereunto set my hand in presence of two subscribing witnesses.

WILLIAM PARISH HOSKINS.

Witnesses:
 HENRY SKERRETT,
 ARTHUR T. SADLER.